United States Patent [19]

Losert et al.

[11] 4,358,935

[45] Nov. 16, 1982

[54] APPARATUS TO PRESERVE VEGETABLES

[75] Inventors: Gehard K. Losert; William M. Webb, both of Louisville, Ky.

[73] Assignee: General Electric Company, Louisville, Ky.

[21] Appl. No.: 279,641

[22] Filed: Jul. 2, 1981

[51] Int. Cl.³ .............................................. F25D 17/02
[52] U.S. Cl. ...................................... 62/188; 62/231; 62/309
[58] Field of Search .................... 62/91, 309, 373, 78, 62/188, 231

[56] References Cited

U.S. PATENT DOCUMENTS

| | | | |
|---|---|---|---|
| 1,956,070 | 4/1934 | Hokanson | 62/309 |
| 1,995,729 | 3/1935 | Zarotschenzeff | 62/104 |
| 2,039,768 | 5/1936 | Bird | 299/62 |
| 3,088,290 | 5/1963 | Zearfoss, Jr. | 62/78 |
| 3,788,542 | 1/1974 | Mee | 239/2 R |
| 3,902,443 | 8/1975 | Mitsui et al. | 239/102 |
| 4,123,917 | 11/1978 | Curtis et al. | 62/309 |
| 4,179,900 | 12/1979 | Corrigan | 62/231 |

*Primary Examiner*—William E. Wayner

*Attorney, Agent, or Firm*—Frederick P. Weidner; Radford M. Reams

[57] ABSTRACT

An improved storage assembly for use in apparatus for preserving and rejuvenating items such as vegetables and the like in a refrigerator maintained at a temperature of between 33° F. and 58° F. by surrounding the items with a fog composed of water particles having a diameter of between 1 and 20 microns generated by means of an ultrasonic wave nebulizer with a transducer element. The storage assembly includes a cover and a pan in sealing arrangement with the cover and movable relative thereto. A water reservoir is located in close proximity to the pan and has the transducer element of the ultrasonic wave nebulizer in communication with water in the reservoir for generating the water particle fog. A passageway is provided for delivering the fog from the interior of the reservoir to the interior of the pan. Electrical connection means for enabling the nebulizer is provided along with timer means to periodically energize and deenergize the nebulizer during the time the electrical connection means would enable the nebulizer.

11 Claims, 8 Drawing Figures

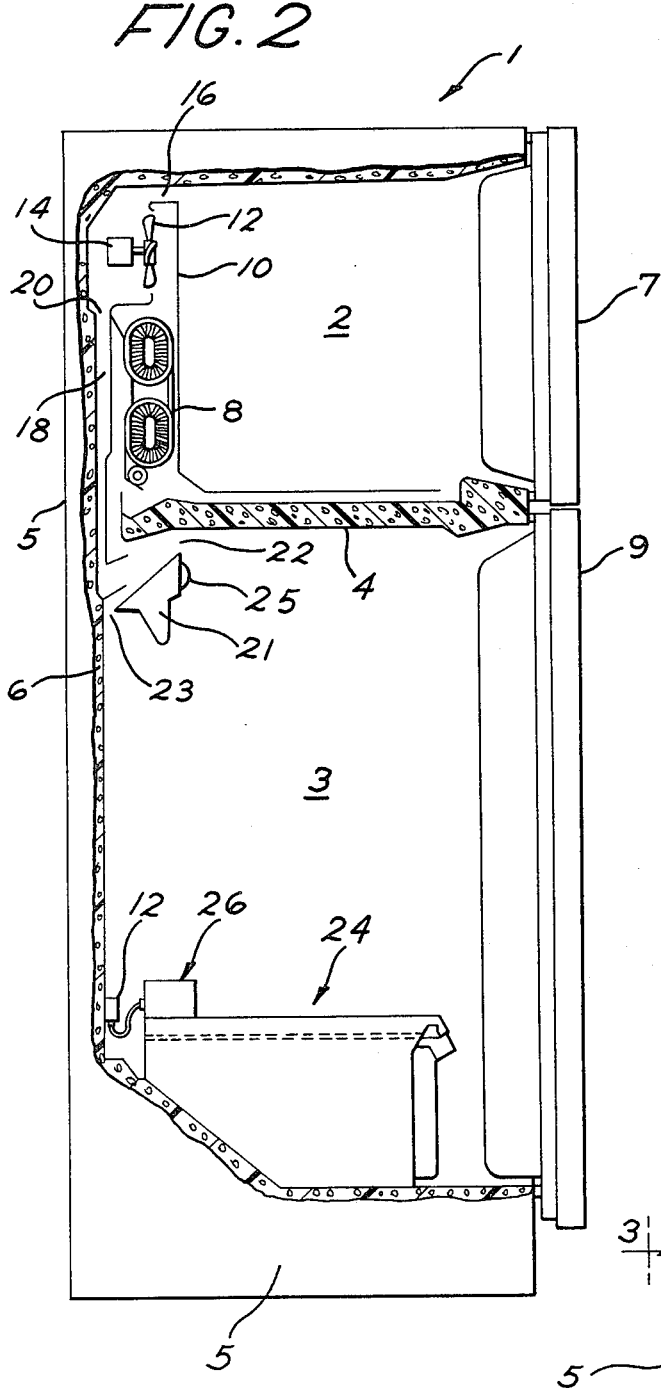
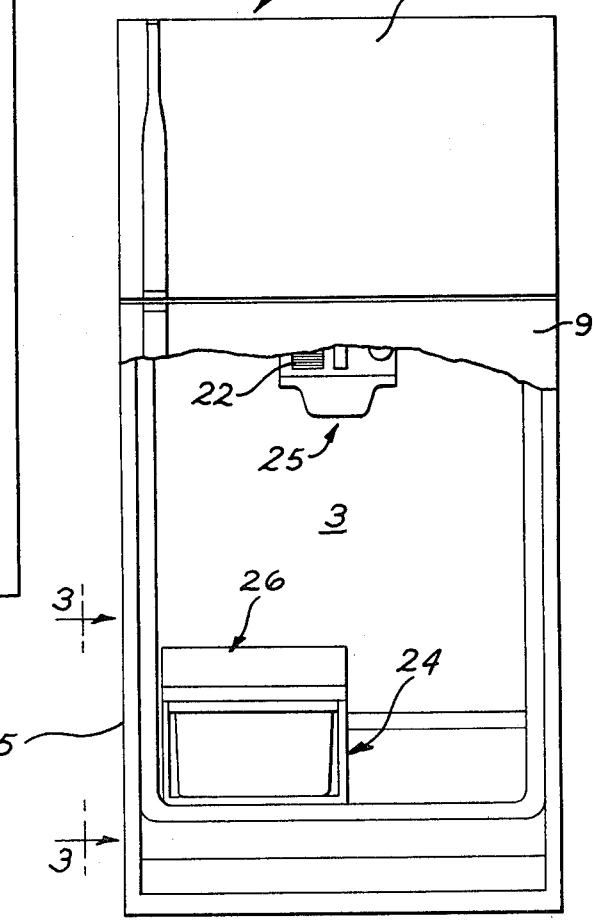

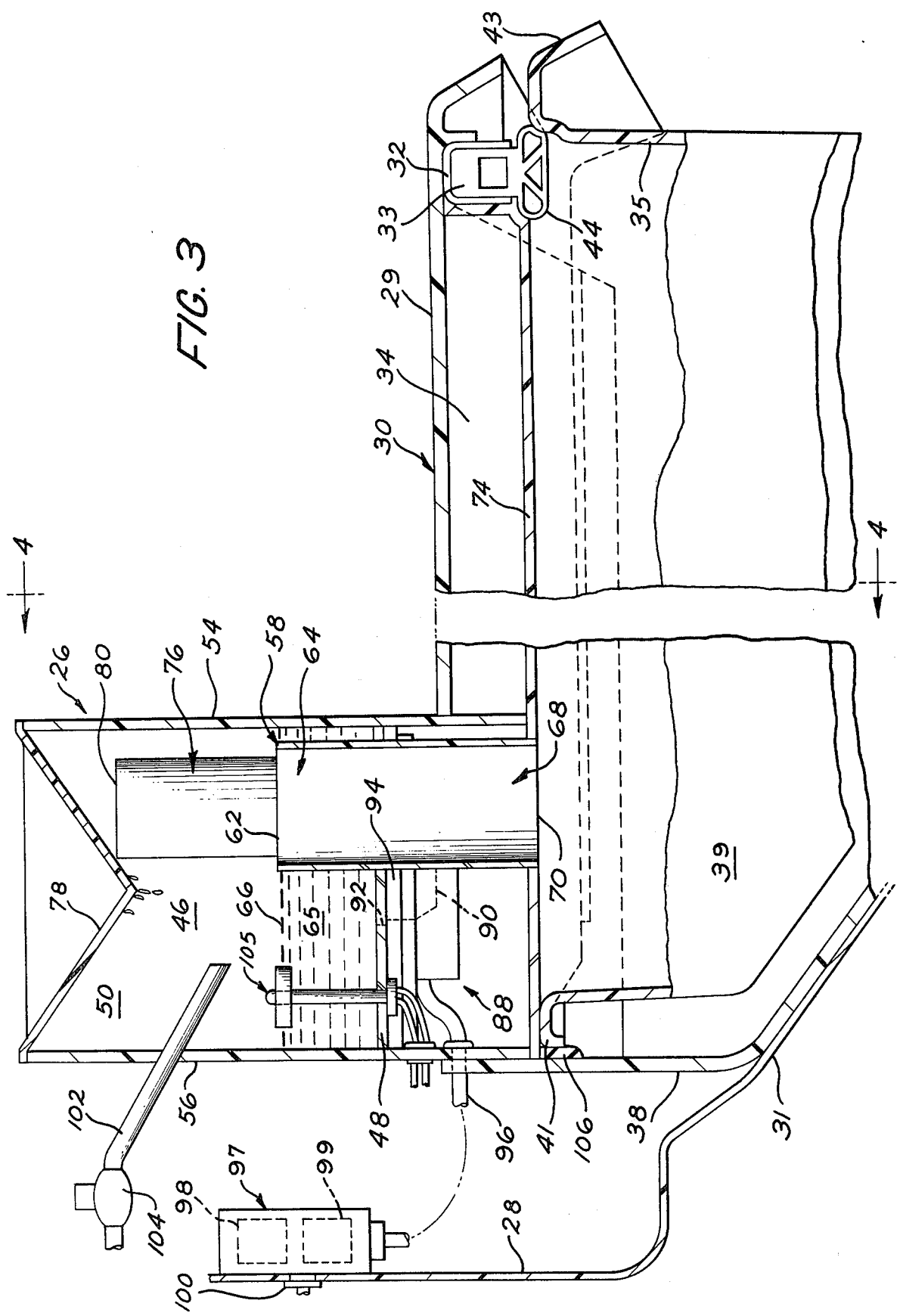

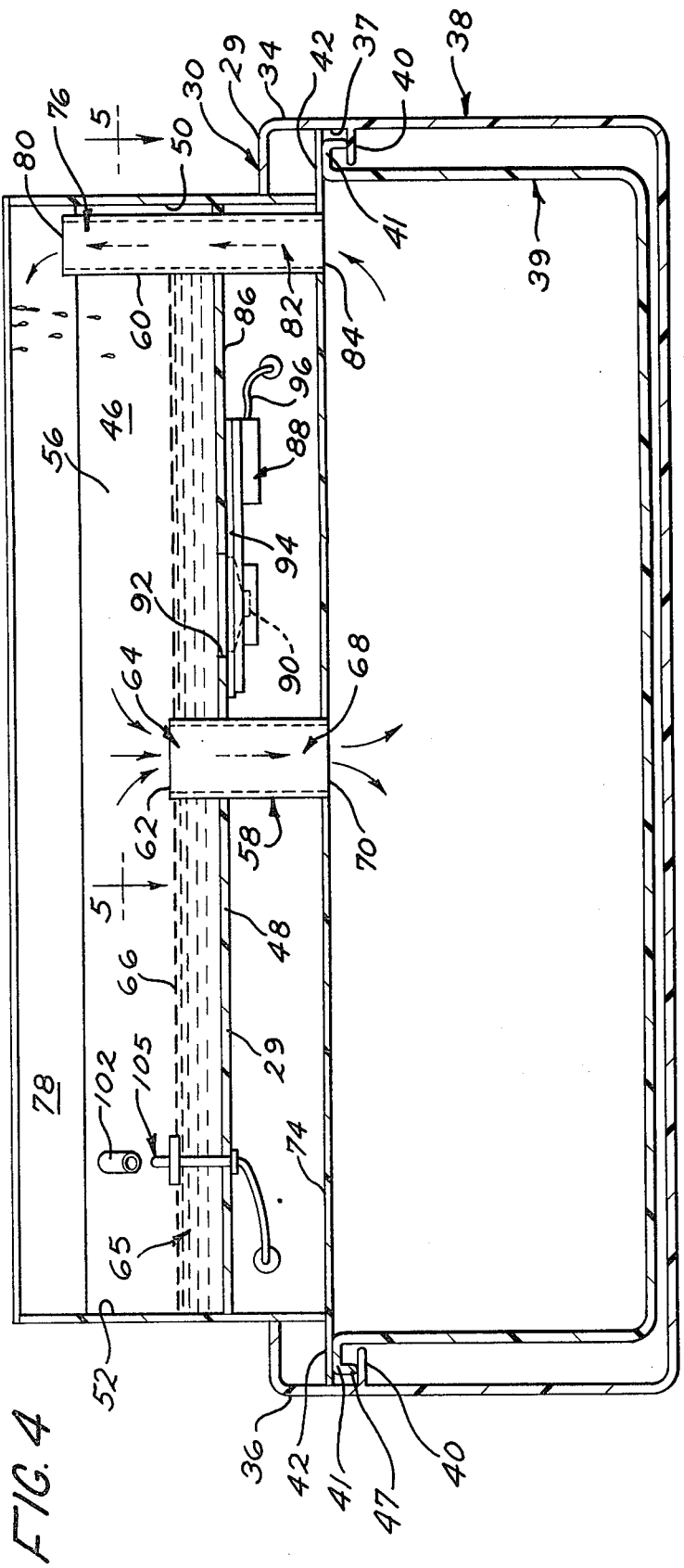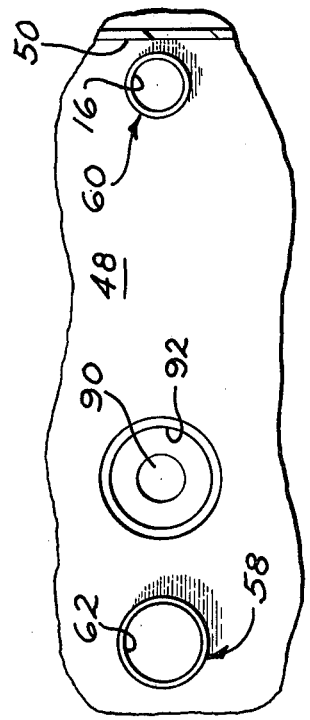
FIG. 4
FIG. 5

APPARATUS TO PRESERVE VEGETABLES

BACKGROUND OF THE INVENTION

This invention relates to apparatus to preserve and rejuvenate items to be stored in a very high humidity atmosphere such as garden vegetables and the like. In particular, the apparatus is preferably utilized in a household refrigerator wherein the items are kept at a cool and above-freezing temperature.

Moisture is lost when vegetables are stored below optimum humidity levels, generally 95% to 98% relative humidity. The process is desorption from the surface of the vegetable, followed by moisture migration from the interior, more surface desorption, etc., until the vegetable is thoroughly desiccated. It has been known for a long time that it is advantageous in order to preserve vegetables to provide some means for hydrating them. Generally, this has been accomplished by providing an atomized spray or fine mist of water that is distributed as a light film on the vegetables. For example, one such arrangement is disclosed in Bird U.S. Pat. No. 2,039,768 wherein a reciprocating nozzle is used to hydrate vegetables. It is also well known that vegetables are preserved by refrigeration and particularly at a high relative humidity. Generally, this kind of atmosphere for the preservation of vegetables is obtained by storing them in vegetable bins located in an above-freezing compartment of a refrigerator. An example of one type of such arrangement is shown in Zearfoss, Jr. U.S. Pat. No. 3,088,290.

In Corrigan U.S. Pat. No. 4,179,900, there is disclosed a system for preserving fresh vegetables in a refrigerator by applying a fine mist made up of particles of about 75-150 micron diameter suspended in air and slowly falling. The mist used in Corrigan is produced by hydraulic pressure means or air pressure.

It is known that water particles may be produced having a smaller diameter than particles formed by hydraulic or pneumatic pressure nozzles and these are formed by an ultrasonic wave nebulizer device. These devices are commonly utilized for nebulizing various liquids and are used as room vaporizers but do not involve heat of vaporization. An example of such a device is disclosed in Mitsui et al U.S. Pat. No. 3,901,443. Environmental control systems such as for preventing frost damage to crops have utilized large size equipment in which water droplets having diameters in the range of from about 5 to 50 microns have been used to cover the crops.

By this invention, there is provided apparatus for preserving and rejuvenating items to be stored in a very high humidity atmosphere, such as garden vegetables and the like, by utilizing a fog of water particles that are so small that they do not settle out to any substantial degree for a very long period of time and surround and engulf the vegetables to provide a very high humidity condition by staying in air suspension many times longer than water droplets produced by hydraulic or pneumatic pressure nozzles.

SUMMARY OF THE INVENTION

According to one aspect of this invention, there is provided an improved storage assembly for use in apparatus for preserving and rejuvenating items such as vegetables and the like in a refrigerator maintained at a temperature of between 33° F. and 58° F. by surrounding the items with a fog composed of water particles having a diameter of between 1 and 20 microns generated by means of an ultrasonic wave nebulizer with a transducer element. The storage assembly includes a cover and a pan in sealing arrangement with the cover and movable relative thereto. A water reservoir is located in close proximity to the pan and has a transducer element of the ultrasonic wave nebulizer in communication with water in the reservoir for generating water particle fog. A passageway is provided for delivering the fog from the interior of the reservoir to the interior of the pan. Electrical connection means for enabling the nebulizer is provided along with timer means to periodically energize and deenergize the nebulizer during the time the electrical connection means would enable the nebulizer.

BRIEF DESCRIPTION OF THE DRAWINGS

FIG. 1 is a front elevational view of a refrigerator having a freezer compartment on top and a fresh food compartment on the bottom showing one form of the present invention embodied therein.

FIG. 2 is a side elevational view, partly in section, of the refrigerator of FIG. 1 and embodying one form of the present invention.

FIG. 3 is a cross-sectional view with parts broken away taken along lines 3—3 of FIG. 1.

FIG. 4 is a cross-sectional view with parts broken away taken along lines 4—4 of FIG. 3.

FIG. 5 is a fragmentary top plan view taken along lines 5—5 of FIG. 4.

DESCRIPTION OF THE PREFERRED EMBODIMENT

Figure 6:
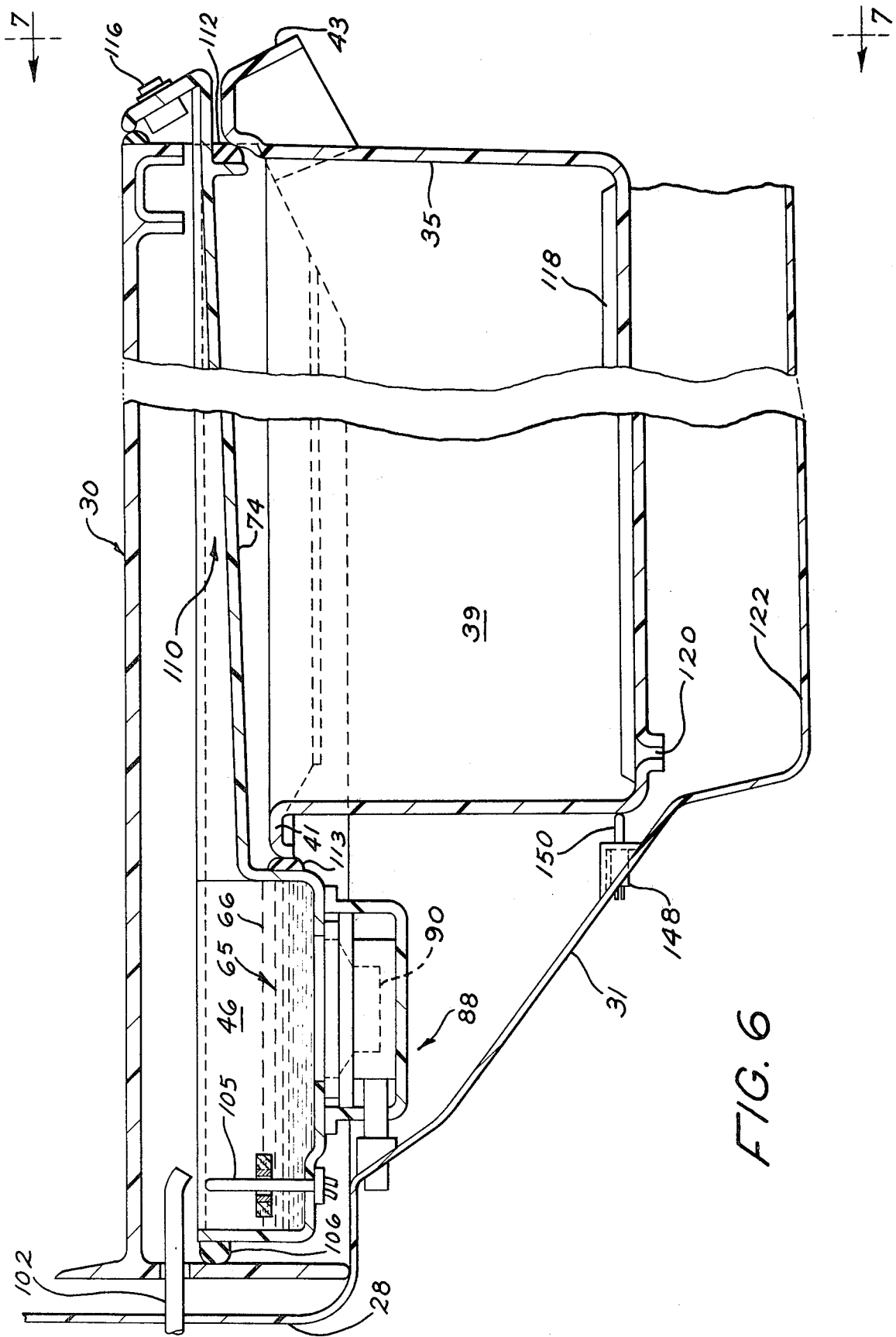
FIG. 6 is a cross-section side elevational view of a modified embodiment of the present invention.

With particular reference to FIGS. 1 and 2 of the drawings, there is shown one embodiment of the present invention in the form of a household refrigerator 1, including an upper freezer compartment 2 and a lower fresh food compartment 3 separated from the freezer compartment by an insulated partition 4. The respective compartments are also separated from the outer shell or outer cabinet walls 5 and the spaces between the compartments and these walls are filled by means of thermal insulation material 6.

A hinged door 7 permits access to the freezer compartment 2 and a hinged door 9 permits access to the fresh food compartment 3. Both of the compartments are maintained at the desired refrigerating temperatures by means of a single evaporator 8 which operates at a below-freezing temperature and is arranged within the freezer compartment 2 and separated from the food storage area of the freezer by a liner 10. For directing air cooled by the evaporator 8 into the two compartments 2 and 3, there is provided a forced air circulating system, including a single air circulating means in the form of a fan 12 driven by a motor 14. Most of the air flow passes into the forward or food storage area portion of the freezer compartment 2 through air passage 16 while a smaller portion of the air is directed through an air duct 18 which is located at the rear of the compartment. The air duct 18 has an air inlet opening 20 where the cold air enters the air duct 18 and then it is directed downwardly to the fresh food compartment 3. The air duct 18 has a baffle 21 with a discharge opening 22 for introducing the cold air into the top of the fresh food compartment 3 and an opening 23 for directing some cold air into the lower portion of the fresh food compartment 3. Conventionally, a cold control 25 for adjusting the desired temperature of the fresh food compartment 3 is provided.

In household refrigerators, it is desirable to provide a pan or storage compartment 24 in which fresh produce such as garden vegetables may be kept. As shown in FIGS. 1 and 2, there is a storage compartment 24 located at the bottom of the fresh food compartment 3. Preferably, the storage compartment 24 is maintained at a temperature of between 33° F. and 45° F. It is desirable to provide a very high humidity atmosphere within the storage compartment 24 to help preserve and rejuvenate the vegetables stored in the storage compartment 24. To accomplish this, by this invention the storage compartment 24 is provided with a very high humidity generating apparatus 26, the operation, arrangement and function of which will now be described.

With particular reference to FIGS. 3-5, the storage compartment 24 includes a cover 30 with a top panel 29 and a lower panel 74, the cover 30 being secured to the inside of the fresh food compartment 3 by means of a removable rigid support member 32 having a u-shaped channel 33. The rigid support member 32 passes through both of the downwardly depending side flanges 34 and 36 of the cover 30 and is attached to the inner walls of the fresh food compartment by any suitable arrangement. Attached or integrally formed with the cover 30 is a shell or housing 38 which rests on a portion 31 of the liner wall 28. The cover 30 has an inwardly open channel on both side flanges 34 and 36 dimensioned to slidably receive the pan 39. Both channels are of the same configuration. For instance, the channel on flange 34 uses the inner surface 37 of the flange as the bottom wall and the two legs 40 and 42 are formed on the inner surface of flange 34 which are parallel and spaced from each other to receive an outwardly directed horizontal depending flange or lip 41 which extends around the top periphery of the pan 39. It will be understood that the pan 39 may be removed from the cover 30 for cleaning, etc. and slides back and forth under the cover 30 on the tracks or channels provided in the side flanges 34 and 36 of the cover 30. For facilitating pan movement, there is a handle 43 for the user to grip on the front wall 35 of the pan 39. To seal the pan 39 across the top of the front wall 35 of pan 39 when the pan is in the completely rearward position relative to the cover 30, as shown in FIG. 3, there is provided along the front of the cover 30 a resilient gasket 44 which abuts the front wall 35. The gasket 44 is retained in its proper stationary position by being supported in the channel 33 of the rigid support member 32 that supports the cover 30. There is also a gasket 106 on the rear wall 45 for the rear of the pan 39 to abut when the pan is in its fully rearward position. The sides of the pan 39 are sealed by the downwardly turned leg 47 of lip 41 being in contact with leg 40 formed on the inner surfaces of flanges 34 and 36.

The high humidity generating apparatus 26 comprises an elongated rectangular-shaped water reservoir 46 having a bottom wall 48, side walls 50 and 52, a front wall 54, and a rear wall 56. The high humidity generating apparatus 26 shown in FIGS. 3 and 4 is secured to the cover 30 and is stationary relative thereto and the arrangement, as will be noted from the drawings, is such that the pan 39 may be moved back and forth along the channels in the side flanges 34 and 36 underneath both the cover 30 and the high humidity generating apparatus 26. The high humidity generating apparatus 26 substantially extends the width of the pan 39 as shown most clearly in FIG. 4. Projecting from the interior of the water reservoir 46 of the high humidity generating apparatus 26 are two conduits 58 and 60 which may be in the form of tubes. Conduit 58 has an opening 62 at the top portion 64 thereof which is in airflow communication with the interior of the water reservoir 46. As shown in the drawings, the opening 62 is located above the bottom wall 48 and specifically above the maximum water level 66 of the water 65 to be retained in the water reservoir 46. This prevents the reservoir water from flowing through the conduit 58 into the underlying pan 39. The conduit 58 has a lower portion 68 which has an opening 70 in airflow communication with the interior of the pan 39. The conduit 58 is sealed against water leakage where it passes through the top panel 29 and lower panel 74 of the cover 30.

Conduit 60, which is positioned at one end of the water reservoir 46, is constructed in a similar manner as conduit 58, however, its upper portion 76 extends higher than the upper portion 64 of conduit 58 and terminates just below a removable top cover 78 for the reservoir 46. Conduit 60 has at its upper end portion 76 an opening 80 and at its lower end 82 an opening 84 in order to accommodate airflow communication with the water reservoir and the interior of the pan 39.

Secured to the bottom surface 86 of bottom wall 48 of the water reservoir 46 is an ultrasonic wave nebulizer 88. The nebulizer used in the high humidity generating apparatus 26 described herein is commercially available and operates on a low voltage such as 48 VAC and is an electronic module which produces an ultrasonic frequency of 1625 to 1740 KHZ to produce a fine fog or mist which visually looks somewhat like cigarette smoke. Such ultrasonic wave nebulizers produce water particles having a diameter of between 1 and 20 microns which, of course, is much smaller than particles produced by mechanical, hydraulic or pneumatic water particle producing devices. The ultrasonic wave nebulizer 88 includes a transducer element 90 which when operating and in contact with water causes the water particles to be formed. To accomplish this, the arrangement shown in the drawings provides for an opening 92 in the bottom wall 48 a little larger than the transducer element 90. Surrounding the opening 92 is a water seal member 94 which is secured to the bottom surface 86 of the lower wall 48. By this arrangement, only the transducer element 90 is exposed to the water 65 in the reservoir 46 and thus the rest of the nebulizer 88 is electrically insulated from contact with the water in the reservoir 46.

To energize the ultrasonic wave nebulizer 88, there is electrical connection means 96 such as an electrical conduit that leads from the ultrasonic wave nebulizer 88 to a control box 97 containing a transformer 98 which is utilized to convert household voltage to the low voltage necessary to operate the nebulizer 88. To operate the ultrasonic wave nebulizer 88 through the transformer, there is a control module 99 also in the control box 97 that is suitably arranged to continuously or preferrably periodically, such as by a timer device (FIG. 8), energize and de-energize the nebulizer 88. Conveniently, the control box 97 may be plugged into or otherwise connected to an electrical receptacle 100 located on the liner 28 of the refrigerator and through which household electric current is supplied.

Figure 8:
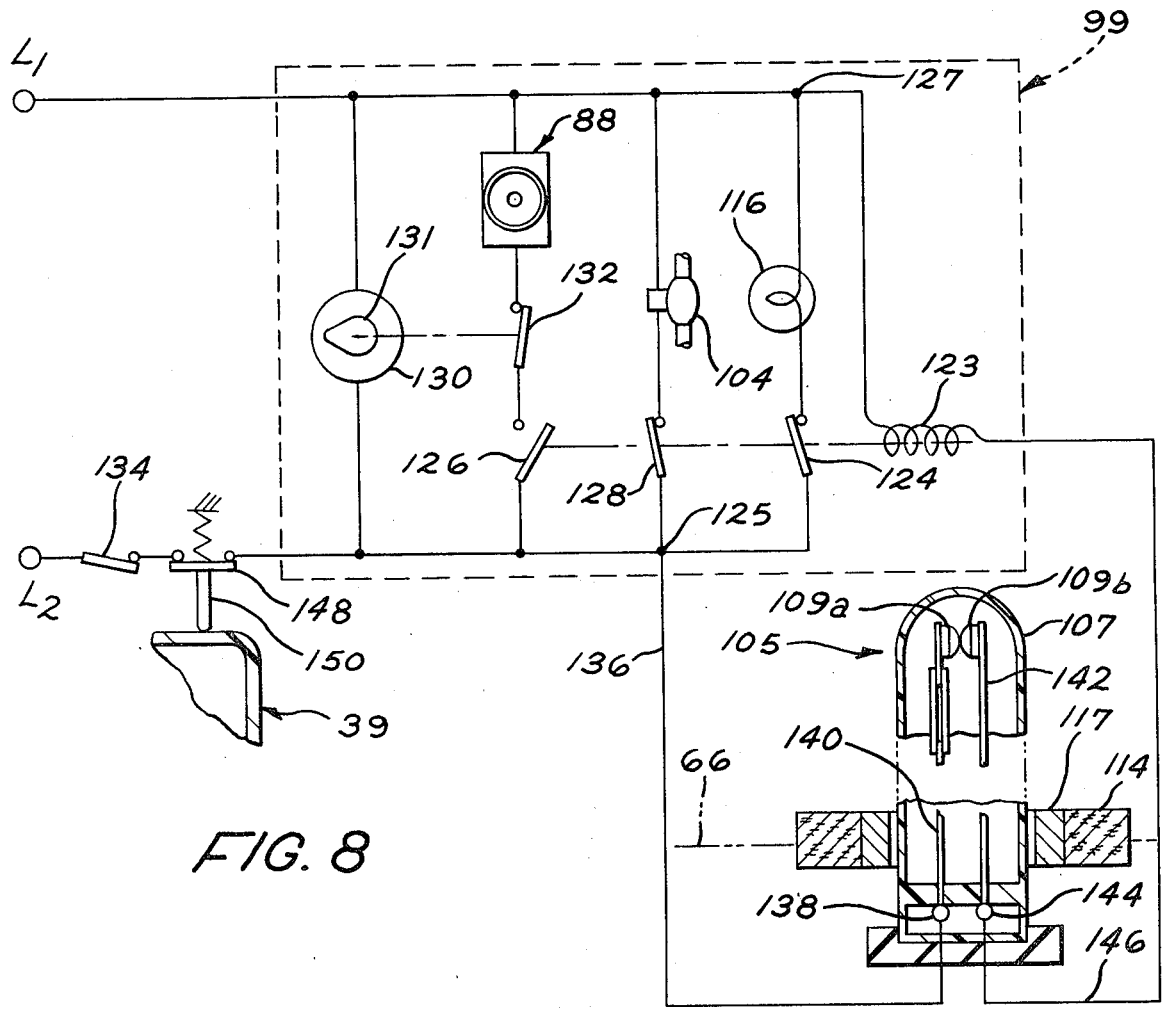
FIG. 8 is a schematic of the control system for the modified embodiment of the present invention shown in FIGS. 6 and 7.

While the water reservoir 46 may be filled with water manually, in the preferred embodiment there is a water supply conduit 102 which projects into the reservoir 46 and by means of a water valve 104 responsive to a suitable water level determining device 105 for turning on the water valve and turning it off, the water level in the reservoir 46 may be automatically maintained at its desired level. It will, of course, be necessary to have a water supply available for automatic filling of the water reservoir 46. Such a water supply could be similar to a water supply conduit plumbed in from a household water system into the refrigerator for filling automatic ice makers. While there are many suitable water level determining devices, the particular one used and shown in detail in FIG. 8 utilizes a hermetic reed switch sealed in a glass envelope 107 and having contacts 109a and 109b located inside near the top of the envelope 107. A ring-shaped float 114 having buoyant material 115 and a magnet 117 is in close proximity to the envelope and moves up and down along the stationary glass envelope 107 responsive to the water level in the reservoir. Electrical connection to energize a solenoid 123 to operate several switches, as will be discussed later, is from junction 125 of line L2, conductor 136, reed switch connector 138 located inside envelope 107, through spring biased arm 140 to contacts 109a and 109b when the contacts are closed. The electrical circuit is then from arm 142 carrying contact 109b to reed switch connector 144, conductor 146 to solenoid 123 to junction 127 at the other side of the line L1. The contacts 109a and 109b are biased closed, as shown in FIG. 8, when the float 114 is at the minimum predetermined water level and they are not acted upon by the magnet 117 thus energizing the solenoid 123. Conversely, when the float 114 is above the predetermined minimum water level, the contacts 109a and 109b are open because magnet 117 overcomes the spring bias and solenoid 123 is not energized.

In operation, the vegetables to be preserved and rejuvenated are placed in the pan 39, which is maintained at a temperature of 33° F.–58° F. and preferably between 35° F.–45° F., by gripping the handle 43 and sliding the pan forward depositing the vegetables in the pan and then sliding the pan rearward so that the front wall 35 of the pan 39 seals against gasket 44 at the front thereof and lip 41 abuts and seals against gasket 106 at the rear thereof. Water for hydrating vegetables may be added to the reservoir either manually or, as mentioned above, preferably by an automatic water fill arrangement and the ultrasonic wave nebulizer 88 energized. As mentioned above also, an electrical circuit may be arranged through a timer device that will periodically energize and deenergize the nebulizer as will be discussed in further detail subsequently. Upon energization of the nebulizer, the water in contact with the transducer element 90 will be transformed into particles having a diameter of between 1 and 20 microns and preferably between 1 and 10 microns and will at least partially fill the interior of the water reservoir 46 above the water level 66. When sufficient mist or fog is generated, the particles will flow in an air path through opening 62 of conduit 58, pass through the conduit and exit via opening 70 into the interior of the pan 39. The water particles will engulf and surround the produce and, in effect, are in air flow communication with the stored items or vegetables in the pan 39. The air in the pan may be returned to the upper portion of water reservoir 46 by passing upwardly through opening 84 into conduit 60 and then into the water reservoir 46 via opening 80. The airflow path is indicated by the arrows shown in FIG. 4.

Figure 7:
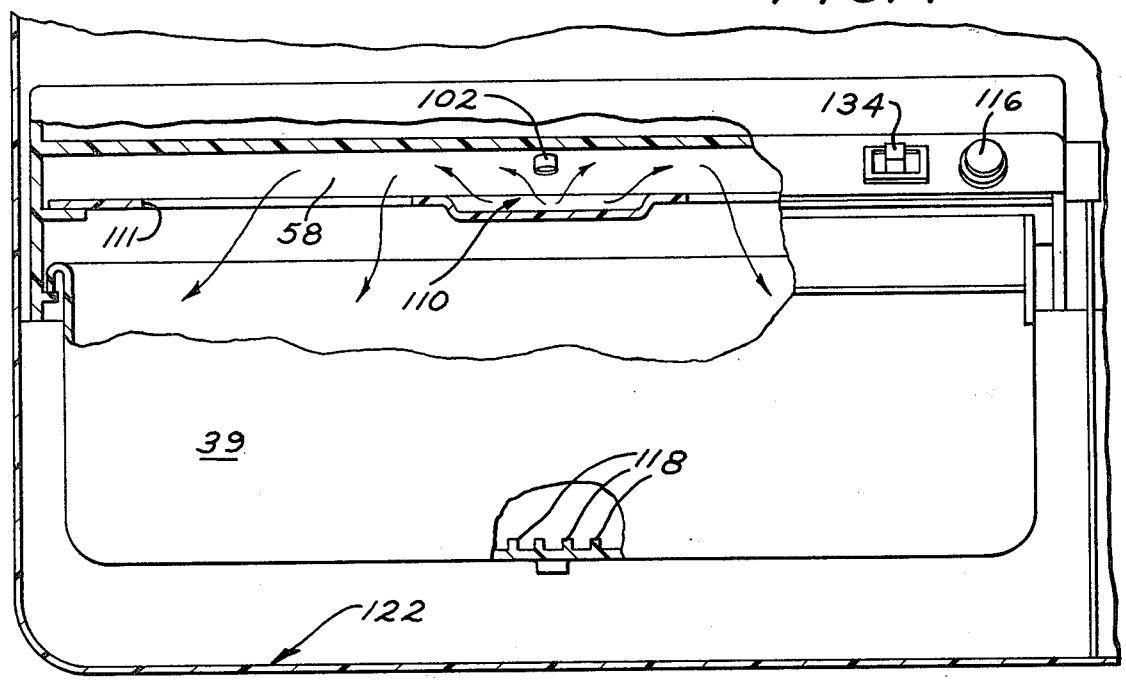
FIG. 7 is a partial cross-sectional front elevational view of the modified embodiment of the present invention shown in FIG. 6 taken along lines 7—7 with portions broken away.

With reference to FIGS. 6, 7 and 8, there is shown a modified embodiment of the storage compartment 24 which has incorporated therein several desirable features not in the embodiment shown in FIGS. 3–5. It will be noted that the cover top panel 29 of cover 30 has a flat surface from front to back to facilitate more shelf area for refrigerated items stored in the fresh food compartment 3. The lower wall 74 of the cover 30 is arranged to be removable from the refrigerator and has formed therein a channel 110 as part of the passageway leading from the reservoir 46 located behind the pan 39 when the pan is in its rearward position as shown in FIG. 6. The channel 110 is elongated and extends along the top of the pan and substantially the length thereof. This channel helps provide for migration of the generated fog toward the front of pan 39. Passageway openings 111 in the lower wall 74 adjacent the channel 110 facilitate flow communication of the fog with the interior of the pan 39 thus providing for more widespread distribution of the fog to the interior of the pan. In addition, if the storage compartment 24 is designed to have the reservoir 46 manually filled with water, the user may grip the removable lower wall 74 and move it out slightly from underneath the cover top panel 29 and pour water into channel 110 whereupon it will flow rearward through the channel into the reservoir 46 and fill it. With the lower wall 74 removable from the cover top panel 29, it is desirable to provide a front gasket seal 112 and a rear gasket seal 113 so the pan 39 is adequately sealed against air leakage when the pan 39 is in its rearward position as shown in FIG. 6. The sides of the pan 39 are sealed in the same manner as described in connection with the storage compartment embodiment shown in FIGS. 3 and 4.

The modified embodiment of the storage compartment 24 shown in FIGS. 6, 7 and 8 also includes a minimum water visual indicator 116, such as a lamp, which is energized responsive to the water level determining device 105. It is also desirable that the water level determining device disconnect the ultrasonic wave nebulizer 88 from the electrical connection means to disable the nebulizer should the water level in the reservoir reach the predetermined minimum level. This will prevent the ultrasonic wave nebulizer from being energized if there is not sufficient water in the reservoir as otherwise if the nebulizer is operated without water it could be detrimentally affected. In addition, it is also desirable to have the the water level determining device open the water valve 104 when the predetermined minimum level is reached to allow water to flow through the conduit 102 into the reservoir and refill it. When the predetermined minimum water level is exceeded by the incoming fill water, the liquid level determining device 105 will close the water valve 104 and stop the flow of water. If it is desirable to have the reservoir filling operation continue for a longer period, the control arrangement may include a timed fill or arrangements such as additional switch means can be made for closing the water valve when a preselected maximum water level is reached.

Another feature of the modified arrangement of the storage compartment 24 shown in FIGS. 6, 7 and 8 is that the bottom of pan 39 is provided with a raised drain board 118 to facilitate the fog surrounding the items stored in the pan. There is also provided an opening 120 in the bottom of the pan 39 to drain accumulated water from the pan. The drained water will drip from the opening 120 down into a sump area 122 whereupon it will gradually evaporate and be dissipated.

With reference to FIG. 8 there is shown a schematic of the control system for the storage compartment 24 having electrical leads L1 and L2 leading into and out of the control module 99 respectively, and the water level determining device 105 electrically connected to the module 99. When the water level determining device 105 energizes solenoid 123 responsive to reaching the predetermined minimum water level in the reservoir 46, as previously discussed, switch 124 will be actuated to energize the visual indicator 116. Energization of the solenoid 123 will also actuate normally-closed switch 126 which will disconnect the nebulizer 88 from the electrical connection means to disenable the nebulizer so that it will not operate. Switch 128 will also be actuated when the solenoid 123 is energized so that the water valve 104 is opened and the reservoir may be automatically filled with water. As mentioned previously in connection with the storage compartment 24 shown in FIGS. 3-5, the nebulizer 88 may be periodically energized and de-energized during the time the electrical connection means enables the nebulizer. To accomplish this a timer device 130 with a cam 131 and linkage means may be used which will open and close a switch 132 such that the nebulizer 88 will be energized for a predetermined period of time provided switch 126 is closed assuring that sufficient water is in the reservoir for operation without harm to the nebulizer 88. The timer will subsequently de-energize the nebulizer for a predetermined period of time. The cycled periods of energization and de-energization of the nebulizer will be predesigned depending upon the desired amount of fog to be generated to provide a pan of a particular volume with sufficient fog to preserve and rejuvenate the items stored in the pan. It is desirable to have a manual switch so the user may turn the entire operation of the storage compartment 24 "on" and "off". For this purpose, such a switch 134, accessible at the front of the storage compartment 24 for operation by the user, is provided. It is also desirable to have a switch to turn the entire operation of the storage compartment 24 "off" including disabling the nebulizer 88 when the pan 39 is moved forward relative to the cover 30 as for instance when vegetables are being placed in the pan 39 by the user or the pan is removed for cleaning. A normally open spring biased plunger type switch 148 mounted at the rear of pan 39 in portion 31 of the liner 28 will open when the pan 39 is moved forward thus breaking the electrical circuit and will close, as shown in FIG. 8, when the pan 39 is in place and moved rearward thereby depressing the plunger 150 overcoming the spring bias force of the switch.

It will be understood, if the storage compartment 24 is to be removable from the refrigerator, then plug-in electrical sockets or receptacles would be used for easily connecting and disconnecting the power source. If the water for the reservoir is to be automatically supplied, a plug-in water line connection with appropriate sealing against leakage would also be used.

It is well known, as pointed out in the Background section hereof that garden vegetables retain their freshness and are preserved longer when subjected to very high humidity as opposed to a less humid atmosphere. By this invention, the fog generated is composed of extremely fine particles and thus provides a very high humidity atmosphere and prevents substantial run-off of the water as it takes an extremely long period of time for the particles to settle out of the atmosphere surrounding the vegetables. For instance, water particles of 1-10 microns in diameter are two or three times smaller than particles formed by hydraulic nozzles and they have setting velocities five or six times slower. We have found that wilted vegetables, such as lettuce, non-savory type leaf spinach and celery, when subjected to the above-described method were rejuvenated. We have also found that the characteristics of vegetables, such as shrivel, texture, color and odor, with regard to such vegetables as lettuce, spinach, green beans, celery and broccoli were as good or better for a period of time by employing the apparatus of this invention as compared to the usual refrigerator storage facilities such as vegetable storage containers or pans.

The foregoing is a description of the preferred embodiments of the apparatus of the invention and it should be understood that variations may be made thereto without departing from the true spirit of the invention as defined in the appended claims.

We claim:

1. In apparatus for preserving and rejuvenating items such as vegetables and the like in a storage assembly in a refrigerator maintained at a temperature of between 33° F. and 58° F. by surrounding the items with a fog composed of water particles having a diameter of between 1 and 20 microns generated by means of an ultrasonic wave nebulizer with a transducer element, an improved storage assembly comprising;

a cover;
a pan in sealing arrangement with the cover and movable relative thereto;
a water reservoir located in close proximity to the pan and having the transducer element of the ultrasonic wave nebulizer in communication with water in the reservoir for generating the water particle fog;
a passageway for delivering the fog from the interior of the reservoir to the interior of the pan;
electrical connection means for enabling the nebulizer; and
timer means to periodically energize and deenergize the nebulizer during the time the electrical connection means would enable the nebulizer.

2. In the apparatus of claim 1 wherein the water reservoir has a water level detection device and means to disenable the nebulizer when a predetermined minimum water level is reached.

3. In the apparatus of claim 2 wherein a visual indicator is actuated when the predetermined minimum water level is reached.

4. In the apparatus of claim 2 wherein a conduit from a water supply source communicates with the interior of the reservoir and a water valve for opening and closing the conduit to allow water to flow and discontinue flow, respectively, said valve being opened responsive to the water level detection device when the predetermined minimum water level is reached.

5. In the apparatus of claim 4 wherein the conduit to fill the reservoir with water includes a plug-in connection to facilitate removal of the storage compartment from the refrigerator.

6. In the apparatus of claim 1 wherein the pan includes a raised drain board to facilitate the fog surrounding the items stored in the pan.

7. In the apparatus of claim 1 wherein the pan has an opening in the bottom thereof to drain accumulated water from the pan.

8. In the apparatus of claim 1 wherein the passageway includes an elongated channel, said channel extending along the top of the pan and substantially the length thereof.

9. In the apparatus of claim 1 wherein the water reservoir is located behind the pan when the pan is in its rearward position and the reservoir extends substantially the width of the pan.

10. In the apparatus of claim 1 wherein a manually actuated switch is included to turn the entire operation of the storage compartment on and off.

11. In the apparatus of claim 1 wherein the electrical connection means for enabling the nebulizer includes a plug-in electrical receptacle to facilitate removal of the storage compartment from the refrigerator.

* * * * *